United States Patent [19]

Moretti

[11] Patent Number: 4,919,457

[45] Date of Patent: Apr. 24, 1990

[54] RELEASABLE PLUG CONNECTION

[76] Inventor: Erminio Moretti, 8, rue Clot-Bey, F-38028 Grenoble, France

[21] Appl. No.: 314,739

[22] Filed: Feb. 24, 1989

[30] Foreign Application Priority Data

Feb. 29, 1988 [DE] Fed. Rep. of Germany ....... 3806404

[51] Int. Cl.⁵ .............................................. F16L 37/12
[52] U.S. Cl. ..................................... 285/39; 285/340; 285/308
[58] Field of Search ............... 285/319, 320, 340, 348, 285/921, 39, 308

[56] References Cited

U.S. PATENT DOCUMENTS 3,751,078 8/1973 O'Brian et al. ...................... 285/921
4,288,113 9/1981 Saulnier ............................... 285/340
4,630,848 12/1986 Twist et al. .......................... 285/340

FOREIGN PATENT DOCUMENTS 2750547 5/1984 Fed. Rep. of Germany .

Primary Examiner—Randolph A. Reese
Assistant Examiner—Anthony Knight

[57] ABSTRACT

A releasable plug connection for semi-rigid pipes in which the elastic retaining ring for holding a pipe in the connection is seated in a flanged ring portion of the stop ring that limits opening movement of the spring taps of the retaining ring and a supporting ring is located between an end face of the flanged ring portion and a plurality of shoulders spaced around the periphery of the entrance to the connection to hold the retaining ring in place.

6 Claims, 2 Drawing Sheets

RELEASABLE PLUG CONNECTION

BACKGROUND OF THE INVENTION

This invention relates to a releasable plug connection and more particularly to an improved version of the type of plug connection shown in German patent specification No. 27 50 547.

In this plug connection, generally used for connecting semi-rigid pipes or tubing, there is a housing part attached to one pipe having a passage for flow through of the fluid and several internal cavities enlarged in steps for receiving the connecting parts and the other pipe. The shoulder of the innermost or first cavity serves as a stop for the other pipe and the shoulder of a second cavity as an abutment for a sealing ring that presses against the side of the pipe after it is inserted into the housing to make a tight connection. The sealing ring is preceded in the plug-in direction by a retaining ring capable of springing open elastically. The retaining ring is clamped firmly against the shoulder of a third step in the housing part by a sleeve and has inwardly projecting spring tabs that form, in their blocking position, a low truncated cone pointing with its apex in the plug-in direction. These spring tabs serve to hold the pipe in the housing. Located between the second and third shoulders and the sealing ring and the retaining ring is a stop ring, the side of which facing the spring tabs is shaped as a cone.

A disadvantage of this arrangement is that the stop ring can inadvertently be inserted in the wrong direction, that is to say with the cone-shaped side pointing towards the sealing ring. This, of course, would greatly impair the function of the plug connection. Moreover, the sleeve holding in the retaining ring, after being installed, has to be secured by bending over the front edge of the housing. Therefore the housing must conventionally be made of metal.

An object of the present invention is to provide a releasable plug connection and its individual parts in such a way that, with the exception of the elastic retaining ring, all the parts can be made of plastic. Furthermore to provide a connection that can easily be assembled while assuring that all the connecting parts will be assembled in the housing in the correct manner.

SUMMARY OF THE INVENTION

To achieve these objects, the present invention provides an improved releasable plug connection for semi-rigid pipes including a housing part having a passage for fluid and several cavities successively larger in steps for receiving connecting parts and an entrance for receipt of a pipe to be connected. The shoulder of a first and smallest cavity serves as a stop for the pipe and the shoulder of a second larger cavity as an abutment for a sealing ring, the ring having an internal diameter less than the diameter of the pipe. The sealing ring is preceded in the plug-in direction by a retaining ring having inwardly projecting spring tabs which form a truncated cone pointing with its apex in the plug-in direction and capable of springing open elastically and a stop ring is located between the retaining ring and the sealing ring, the side of which facing the spring tabs is shaped as a cone to limit movement of the spring tabs. Arranged ahead of the retaining ring in the plug-in direction is a dismounting ring axially slidable relative to the housing part and having a conically tapered head portion that fans open the spring tabs of the retaining ring and against the side of the stop ring when the dismounting ring is pressed into the housing part to release the pipe. The improvement comprises a flanged ring portion on the stop ring of larger diameter than the cone shaped portion that rests against the shoulder of a third cavity larger than the second cavity and that serves as an abutment for the retaining ring and a supporting ring located in a fourth cavity preceding the third cavity in the plug-in direction between an end face of the flanged ring portion of the stop ring and an inwardly offset shoulder around the periphery of the entrance of the housing part that holds the retaining ring in place.

BRIEF DESCRIPTION OF THE DRAWINGS

Further objects and advantages will appear from the following description of an exemplary embodiment of the invention illustrated in the accompanying drawings in which.

DETAILED DESCRIPTION OF THE INVENTION

Figure 1:
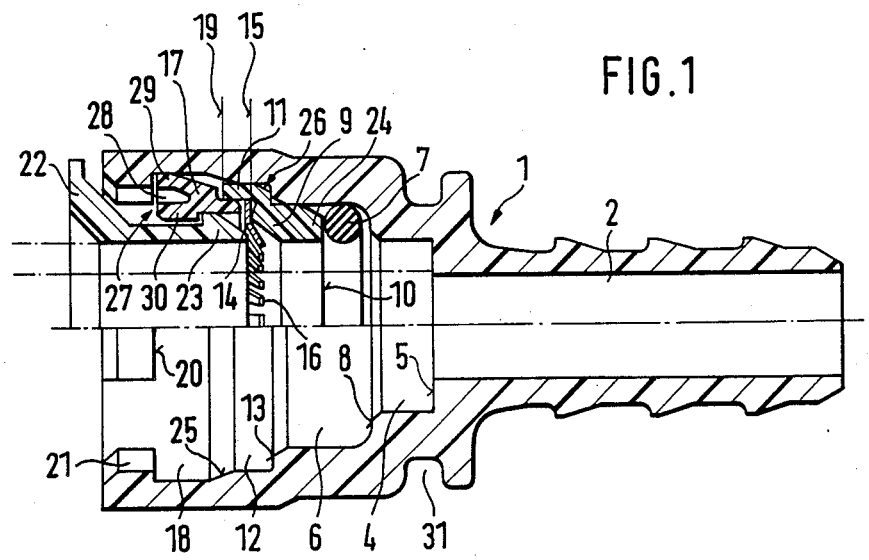
FIG. 1 is a sectional view through the releasable plug-connection housing with the connecting parts shown arranged only in the upper half of the housing.

The plug connection illustrated in the drawings is composed of a housing part 1 having a passage 2 for the flow through of a fluid and several cavities successively larger in steps for receiving a semi-rigid pipe 3, such as a plastic gasoline feed pipe, as well as the connecting parts described in detail below.

The inside diameter of the innermost or first cavity 4 corresponds to the outside diameter of the pipe 3 and has a shoulder 5 serving as a stop for the pipe 3 and limiting its depth of penetration. A second larger cavity 6 holds a sealing ring 7, the inside diameter of which is somewhat smaller than the outside diameter of the pipe 3. The axial movability of sealing ring 7 is limited in the plug-in direction by a shoulder 8 in cavity 6 and on the other side by the end face 10 of a stop ring 9. The inside diameter of stop ring 9 is likewise matched to the outside diameter of the pipe 3 and the outside diameter to the inside diameter of the second cavity 6. Stop ring 9 also has a flanged ring portion 11 which protrudes into a third enlarged cavity 12 and is shaped to rest firmly against a shoulder 13 between cavity 12 and cavity 6. Embedded in the outwardly open flanged ring portion 11 of the stop ring 9 is a retaining ring 14, the outer region of which rests against a shoulder 15 of the stop ring 9 and which has obliquely inwardly projecting spring tabs 16 forming, in their blocking position, a low truncated cone pointing with its apex in the plug-in direction.

Retaining ring 14 is held in place against shoulder 15 by a supporting ring 17. Ring 17 sits in a further-enlarged cavity 18 between an end face 19 of the flanged ring 11 and the inwardly offset shoulders 20 of four hooked-shaped projections 21 formed around the entrance of the housing part 1 and distributed uniformly around its periphery. The inside diameter of the projections 21 is equal to the inside diameter of the cavity 12, so that during assembly the stop ring 9 can easily be guided through as far as the cavity 12.

Mounted in supporting ring 17 so as to be axially displaceable relative to it and housing part 1 is a dismounting ring 22 having a widened and conically tapered head 23 in the plug-in direction that reaches to a point just in front of retaining ring 14. When dismounting ring 22 is pressed in the plug-in direction, spring tabs 16 of the retaining ring 14 are fanned open so that a pipe 3 can be easily pulled out of the plug connection.

Figure 3:
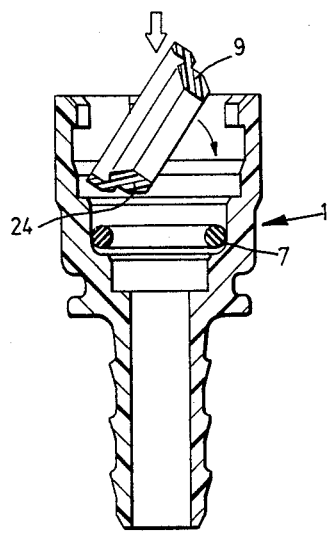
FIGS. 3-6 show the assembly sequence for inserting the connecting parts into the housing.
Figure 4:
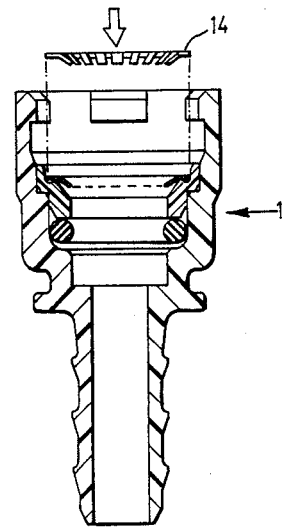

To ensure during the assembly of the plug connection that stop ring 9 is introduced with its front part 24 containing the cone-shaped portion and of smaller outside diameter than the flanged ring portion 11 in the direction of sealing ring 7, the fourth enlarged cavity 18 is designed so that its inner end wall 25 converges conically in the plug-in direction, and furthermore that the outer edge 26 of the flanged ring portion 11 of stop ring 9 likewise converges conically. Also, the front part 24 of the ring, pointing towards sealing ring 7, is designed so that it is thicker and of greater weight than the flanged ring part 11. During assembly, as shown in FIG. 3, stop ring 9 therefore will readily fall into position with the heavier front part 24 leading.

Figure 5:
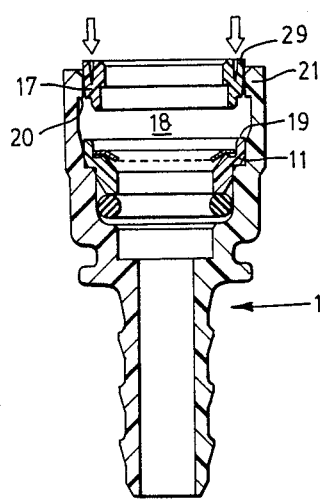

To make supporting ring 17 more flexible for assembly purposes, an annular recess 28 is provided in ring 17 that weakens the cross-section on the end face 27 directed towards the projections 21, so that an elastic outer ring 29 and an elastic inner ring 30 are thereby formed. The advantage of this can be seen in FIGS. 5 and 6. During the introduction of supporting ring 17 as shown in FIG. 5, outer ring 29 is compressed inwardly by the hooks or projections 21, until the supporting ring 17 has entered the cavity 18 and rests against the end face 19 of the flanged ring 11. The outer ring 29 then springs back into its original position and engages the inwardly facing shoulders 20 of the projections 21.

Figure 6:
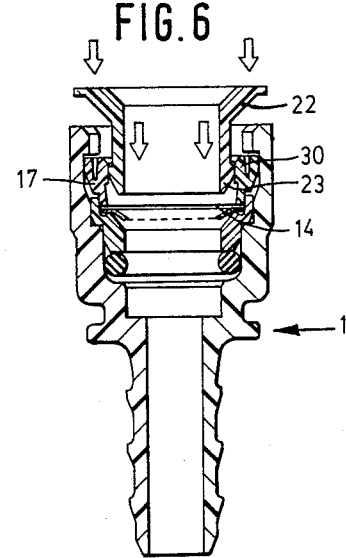

During the introduction of the dismounting ring 22, its front conical head 23 presses the inner ring 30 slightly outwardly, as shown in FIG. 6. As soon as the head 23 overcomes this restriction and has reached its predetermined position just in front of the retaining ring 14, the inner ring 30 springs back again, so that the dismounting ring 22 can be displaced axially while and at the same time be prevented from falling out of the housing.

Figure 2:
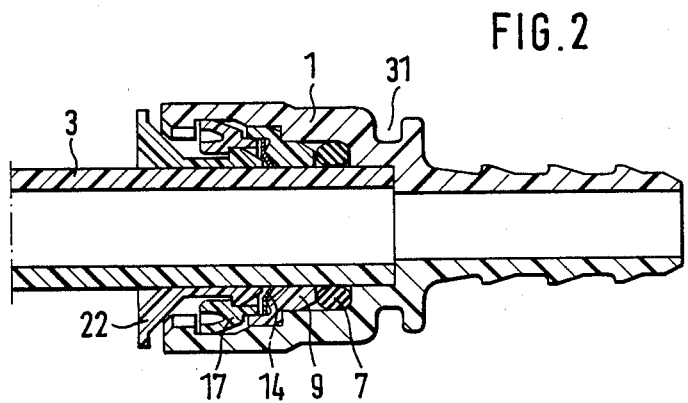
FIG. 2 is a sectional view through the plug-connection housing with a piece of pipe inserted into it.

After assembly of the connecting parts in housing 1 as shown in sequence in FIGS. 3–6 and as shown finally assembled in FIG. 1, a pipe 3 to be connected is merely pushed in through the 1, a pipe 3 to be connected is merely pushed in through the center of dismounting ring 22, passed the spring tabs 16 of retaining ring 14 until its end abuts shoulder 5 in the housing. As shown in FIG. 2, seal ring 7 is compressed by the outer diameter of the pipe to seal the connection while the spring tabs 16 grip the pipe to hold it in place. To disconnect the pipe, it is merely necessary to press in on dismounting ring 22 which fans out the tabs 16 of the retaining ring 14 releasing their grip on pipe 3 and permitting it to be pulled back out of the housing.

The above described device can easily be assembled by hand. At the same time, there is no possibility of faulty assembly. A continuous groove 31 at the end of the housing part 1 also provides a surface for gripping the ready-assembled plug connection by means of a fork or pliers (not shown) during introduction or disconnection of a connecting pipe or hose.

What is claimed is:

1. In a releasable plug connection for semi-rigid pipes including a housing part having a passage for fluid, several cavities successively larger in steps for receiving connecting parts and an entrance for receipt of a pipe to be connected, wherein the shoulder of a first and smallest cavity serves as a stop for the pipe and the shoulder of a second larger cavity as an abutment for a sealing ring, the ring having an internal diameter less than the diameter of the pipes and being preceded in the plug-in direction by a retaining ring having inwardly projecting spring tabs which form a truncated cone pointing with its apex in the plug-in direction and capable of springing open elastically and a stop ring located between the retaining ring and the sealing ring, the side of which facing the spring tabs is shaped as a cone to limit movement of the spring tabs, there being arranged ahead of the retaining ring in the plug-in direction, a dismounting ring, axially slidable relative to the housing part, and having a conically tapered head portion that fans open the spring tabs of the retaining ring and against the side of the stop ring when the dismounting ring is pressed into the housing part to release the pipe, the improvement comprising a flanged ring portion on the stop ring of larger diameter than the cone shaped portion that rests against the shoulder of a third cavity larger than the second cavity and that serves as an abutment for the retaining ring and a supporting ring located in a fourth cavity preceding the third cavity in the plug-in direction between an end face of the flanged ring portion of the stop ring and an inwardly offset shoulder around the periphery of the entrance of the housing part to hold the retaining ring in place.

2. The plug connection of claim 1, wherein the inwardly offset shoulder comprises a plurality of hook-shaped projections uniformly spaced around the periphery of the entrance of the housing part, the inside diameter of the projections being equal to the inside diameter of the third cavity.

3. The plug connection of claim 1, wherein the inner wall connecting the third and fourth cavities converges conically in the plug-in direction, and the outer edge of the flanged ring portion of the stop ring has a similarly shaped surface.

4. The plug connection of claim 3, wherein the cone shaped portion of stop ring has a greater weight than the flanged ring portion.

5. The plug connection of claim 1, wherein the dismounting ring slides axially inside of the supporting ring and is retained inside the housing by the supporting ring.

6. The plug connection of claim 5, wherein the supporting ring has an annular recess in its rear end face providing it with an elastically flexible zone to permit it to be inserted into the fourth cavity and to permit the head portion of the dismounting ring to be inserted into the supporting ring.

* * * * *